(12) United States Patent
Lenahan et al.

(10) Patent No.: US 8,893,152 B2
(45) Date of Patent: Nov. 18, 2014

(54) APPLICATION REGISTRATION WITH A NON-OS SERVICE

(71) Applicant: Intel Corporation, Santa Clara, CA (US)

(72) Inventors: Charlie D Lenahan, New Albany, IN (US); Marc A Funston, Louisville, KY (US)

(73) Assignee: Intel Corporation, Santa Clara, CA (US)

(*) Notice: Subject to any disclaimer, the term of this patent is extended or adjusted under 35 U.S.C. 154(b) by 37 days.

(21) Appl. No.: 13/736,451

(22) Filed: Jan. 8, 2013

(65) Prior Publication Data
US 2014/0068631 A1 Mar. 6, 2014

Related U.S. Application Data

(60) Provisional application No. 61/697,504, filed on Sep. 6, 2012.

(51) Int. Cl.
*G06F 13/00* (2006.01)
*G06F 9/54* (2006.01)

(52) U.S. Cl.
CPC ........................ *G06F 9/54* (2013.01)
USPC .......................... 719/313; 717/174

(58) Field of Classification Search
CPC .................. G06F 8/61; G06F 9/546
USPC .......................... 717/174; 719/313
See application file for complete search history.

(56) References Cited

U.S. PATENT DOCUMENTS 6,510,466 B1    1/2003 Cox et al.
7,623,684 B2 *  11/2009 Kanchwala et al. .......... 382/115

(Continued)

OTHER PUBLICATIONS

International Search Report and Written Opinion, mail date Sep. 27, 2013, PCT/ISA/210, PCT/ISA/220, PCT/ISA/237, total of 9 pages.

(Continued)

*Primary Examiner* — Andy Ho
(74) *Attorney, Agent, or Firm* — Pillsbury Winthrop Shaw Pittman LLP

(57) ABSTRACT

Systems, methods, and apparatuses are directed to application registration with a non-OS service. In one embodiment, logic may be configured to provide an installation indication that an installation of an application has been initiated on an operating system of the communication device to a service configured to run on the operating system. The logic may also be configured to provide, to the application, a registration request that is initiated by the service based on receipt of the installation indication by the service and that notifies the application to register with the service. The logic may further be configured to provide registration information associated with the application to the service based on receipt of the registration request by the application. In another embodiment, the service may be a non-OS service configured to maintain registration information for a plurality of applications installed on the operating system.

20 Claims, 5 Drawing Sheets

(56) References Cited

U.S. PATENT DOCUMENTS

| | | |
|---|---|---|
| 2003/0066065 A1 | 4/2003 | Larkin |
| 2004/0123287 A1* | 6/2004 | Fox et al. ................. 717/176 |
| 2005/0091655 A1 | 4/2005 | Probert et al. |
| 2008/0127170 A1 | 5/2008 | Goldman et al. |
| 2008/0301672 A1* | 12/2008 | Rao et al. ................. 717/177 |
| 2010/0037243 A1* | 2/2010 | Mo et al. ................... 719/328 |
| 2011/0289172 A1 | 11/2011 | Marcellino |
| 2012/0137281 A1* | 5/2012 | Kleiner et al. ............ 717/174 |
| 2012/0266157 A1* | 10/2012 | Mun et al. ................. 717/174 |
| 2013/0283377 A1* | 10/2013 | Das et al. ................... 726/23 |

OTHER PUBLICATIONS

Seungwon, Na et al., "Design and Implementation of Sync Engine for Automatic Installation System of PDA Application Programs", Proceedings 2003 IEEE International Symposium on Computational Intelligence in Robotics and Automation, Jul. 16-20, 2003, pp. 372-377.

* cited by examiner

APPLICATION REGISTRATION WITH A NON-OS SERVICE

CROSS-REFERENCE TO RELATED APPLICATION

This application claims priority and benefit to U.S. Provisional Patent Application No. 61/697,504, filed on Sep. 6, 2012, which is incorporated herein by reference in its entirety.

TECHNICAL FIELD

This disclosure relates generally to application registration, and in particular, to application registration with a non-operating system (OS) service.

BACKGROUND ART

An operating system (e.g., certain versions of the Android operating system) may not include various installation procedures that enable applications to perform registration with applications, services, or other components installed on the operating system. For example, with respect to the Android operating system, applications are simply copied over as .apk files. As a result, registration with other components on the operating system is performed by those applications each time the applications are started to ensure that such registration is performed before further interactions with those other components. In addition, an operating system may not notify an application or service that a new application is being installed if, for instance, the application or service is not running during the installation.

DETAILED DESCRIPTION

Figure 1:
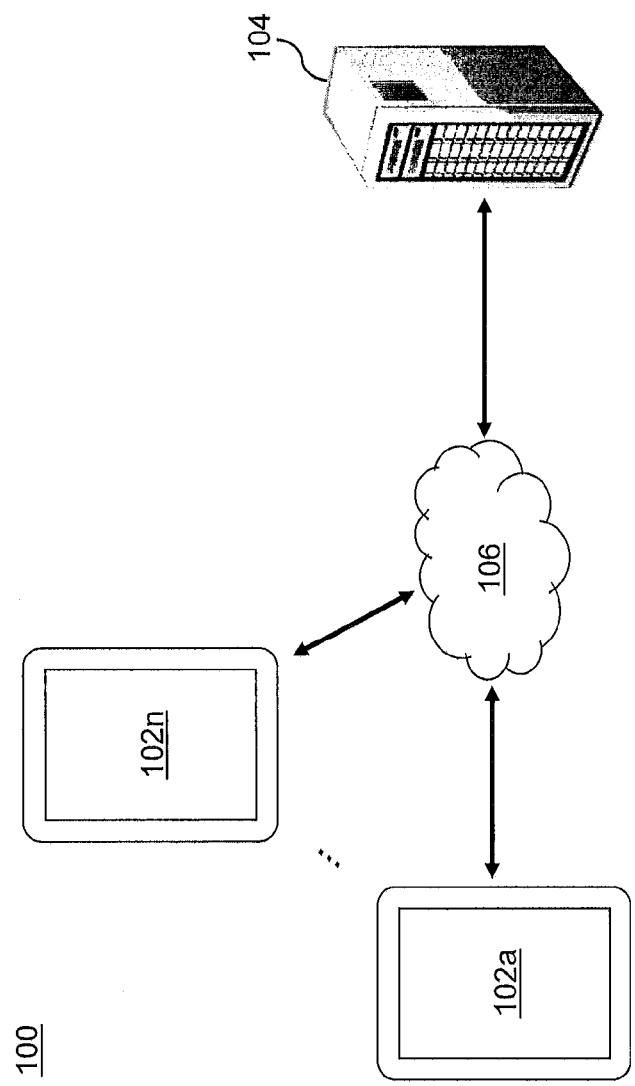
FIG. 1 depicts a high-level functional block diagram of a system for facilitating application registration with a non-OS service, in accordance with various aspects of the present disclosure.

In the description that follows, like components may be given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, devices, systems, and/or methods for facilitating application registration with a non-OS service are proposed. In one embodiment, a communication device for facilitating application registration with a non-OS service may include a memory unit, and logic configured to: provide an installation indication that an installation of an application has been initiated on an operating system of the communication device to a service configured to run on the operating system; provide, to the application, a registration request that is initiated by the service based on receipt of the installation indication by the service and that notifies the application to register with the service; and provide registration information associated with the application to the service based on receipt of the registration request by the application.

In another embodiment, a system for facilitating application registration with a non-OS service may include a communication device that includes a memory unit and logic configured to: provide an installation indication that an installation of an application has been initiated on an operating system of the communication device to a service configured to run on the operating system; provide, to the application, a registration request that is initiated by the service based on receipt of the installation indication by the service and that notifies the application to register with the service; and provide registration information associated with the application to the service based on receipt of the registration request by the application.

In another embodiment, a method for facilitating application registration with a non-OS service may include: providing an installation indication that an installation of an application has been initiated on an operating system of the communication device to a service configured to run on the operating system; providing, to the application, a registration request that is initiated by the service based on receipt of the installation indication by the service and that notifies the application to register with the service; and providing registration information associated with the application to the service based on receipt of the registration request by the application.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a," "an," and "the" include plural referents unless the context clearly dictates otherwise.

FIG. 1 depicts a high-level functional block diagram of a system 100 for facilitating application registration with a non-OS service, in accordance with various aspects of the present disclosure. As illustrated, system 100 includes one or more communication devices 102, a content provider server 104, and a communication network 106. It should be noted that communication device 102 may represent any of a number of electronic and/or computing devices, both wireless and wired. As such, in some embodiments, communication device 102 may comprise desktops, laptops, mobile devices, smart phones, gaming devices, tablet computers, and/or other devices.

Communication device 102 and/or other devices may communicate over communication network 106, for instance, to interact with a content provider server 104, to interact with one or more other network devices, or to perform other functions. For example, communication device 102 may interact with content provider server 104 to retrieve applications and/or other content from content provider server 104. It should be noted that the communication mechanisms and networks as described herein are not intended to be limiting in any way, as the communications could be based on one or more standards and protocols including, but not limited to, Ethernet, Wi-Fi, Wi-Fi Direct, Bluetooth, NFC, radio frequency, GSM, CDMA, GPRS, 3G or 4G (e.g., WiMAX, LIE, etc.) cellular standards, Wireless USB, satellite communication, infrared, sonar, etc., and communication network 106 may comprise the Internet or any other suitable network, such as peer-to-peer, intranets, extranets, etc.

As used herein, a service may refer to a component of an application that provides functionality for other applications and/or software programs to use. In some embodiments, although a service may be at least part of an application, a service may be independently run or may continue to run when its corresponding application is shutdown, not running, and/or not active. A non-OS service may refer to a service that is not built into an operating system on which the service is running. For example, the non-OS service may not be an integral part of the operating system. In some embodiments, a non-OS service may be installed on and uninstalled from the operating system at communication device 102, for instance, at the direction of a user of communication device 102.

In one embodiment, with respect to FIG. 1, an installation indication that an installation of an application has been initiated on an operating system of communication device 102 may be provided to a service configured to run on the operating system. A registration request may be initiated by the service based on receipt of the installation indication by the service, and then provided to the application to notify the application to register with the service. Registration information associated with the application may be provided to the service based on receipt of the registration request by the application. The registration information may, for instance, include an application identifier, a file location associated with the application, code for interacting with the application, and/or other information relating to registration of the application.

In another embodiment, the service may be a non-OS service configured to run on the operating system. In certain embodiments, the service may be at least part of another application installed on the operating system that is different from the application associated with the installation indication. In some embodiments, the service may be configured to maintain registration information for a plurality of applications installed on the operating system and/or perform other functions for the installed applications. In this way, the service may facilitate application registration for the plurality of applications even if the operating system does not enable those applications to register themselves with other applications, services, or components installed on the operating system.

Figure 2:
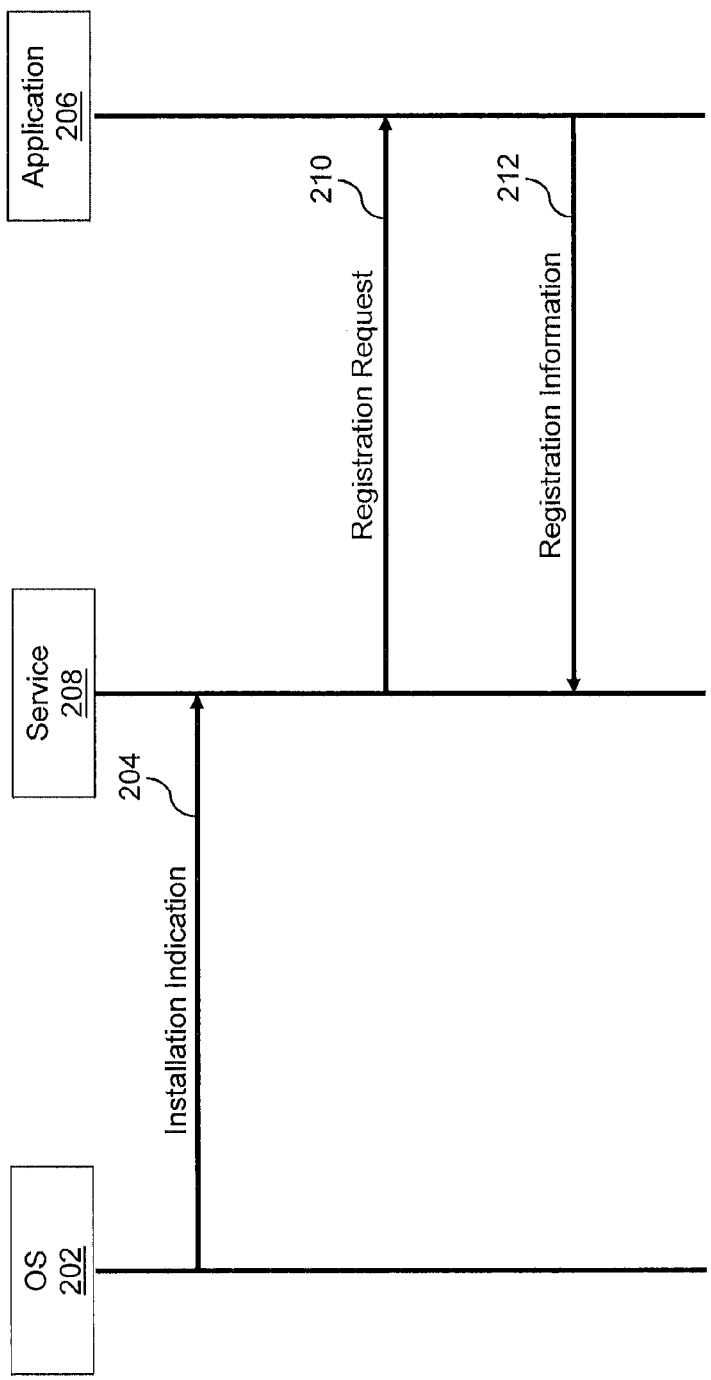
FIG. 2 depicts a flow diagram illustrating application registration with a non-OS service that is running during a broadcast of an installation indication, in accordance with various aspects of the present disclosure.

In another embodiment, the installation indication may be provided to the service by broadcasting the installation indication. The installation indication may be broadcasted such that services and/or applications at communication device 102 that are running receives the installation indication via the broadcasting while services and/or applications at communication device 102 that are not running do not receive the installation indication via the broadcasting. For example, along these lines, FIG. 2 depicts a flow diagram illustrating application registration with a non-OS service that is running during a broadcast of an installation indication, in accordance with various aspects of the present disclosure. As shown by FIG. 2, operating system 202 may broadcast installation indication 204 in response to application 206 being installed on operating system 202. Installation indication 204 may, for instance, specify that application 206 is being installed and may include an application identifier, a file location associated with the application, and/or other information relating to the application.

In this example, service 208 may be a service that is configured to maintain registration information and/or perform other functionalities for a plurality of applications that are installed on operating system 202. Service 208 may be running when installation indication 204 is broadcasted by operating system 202. As such, service 208 may receive installation indication 204 from operating system 202. Service 208 may then initiate registration request 210 to notify application 206 to register with service 208. In response to receipt of registration request 210, application 206 may run code linked from a software development kit (SDK) or other development tools associated with service 208 to register with service 208. During such registration, application 206 may provide registration information 212 associated with application 206 to service 208. Service 208 may then store and maintain registration information 212.

In another embodiment, returning to FIG. 1, an installation indication that an installation of an application has been initiated on an operating system of communication device 102 may be broadcasted in response to installation of the application on the operating system. Although the installation indication may be broadcasted, a service configured to run on the operating system may not receive the installation indication via the broadcasting. For example, the operating system may be configured such that services and/or applications that are shutdown, not running, and/or not active during a broadcast may not receive information from the broadcast.

In some embodiments, the service may initiate a query request for information specifying applications that have been installed on the operating system. For example, the service may initiate the query request during startup of the service. As such, even if the service may not have received the installation indication during a broadcast while the service was shutdown, not running, and/or not active, the service may initiate the query request during the service startup to receive the installation indication via the information specifying installed applications. In response to being provided with the installed-applications information, the service may utilize the installed-applications information to initiate a registration request to notify an installed application to register with the service. In this way, the service may register applications with the service regardless of whether the service is running when those applications are installed.

Figure 3:
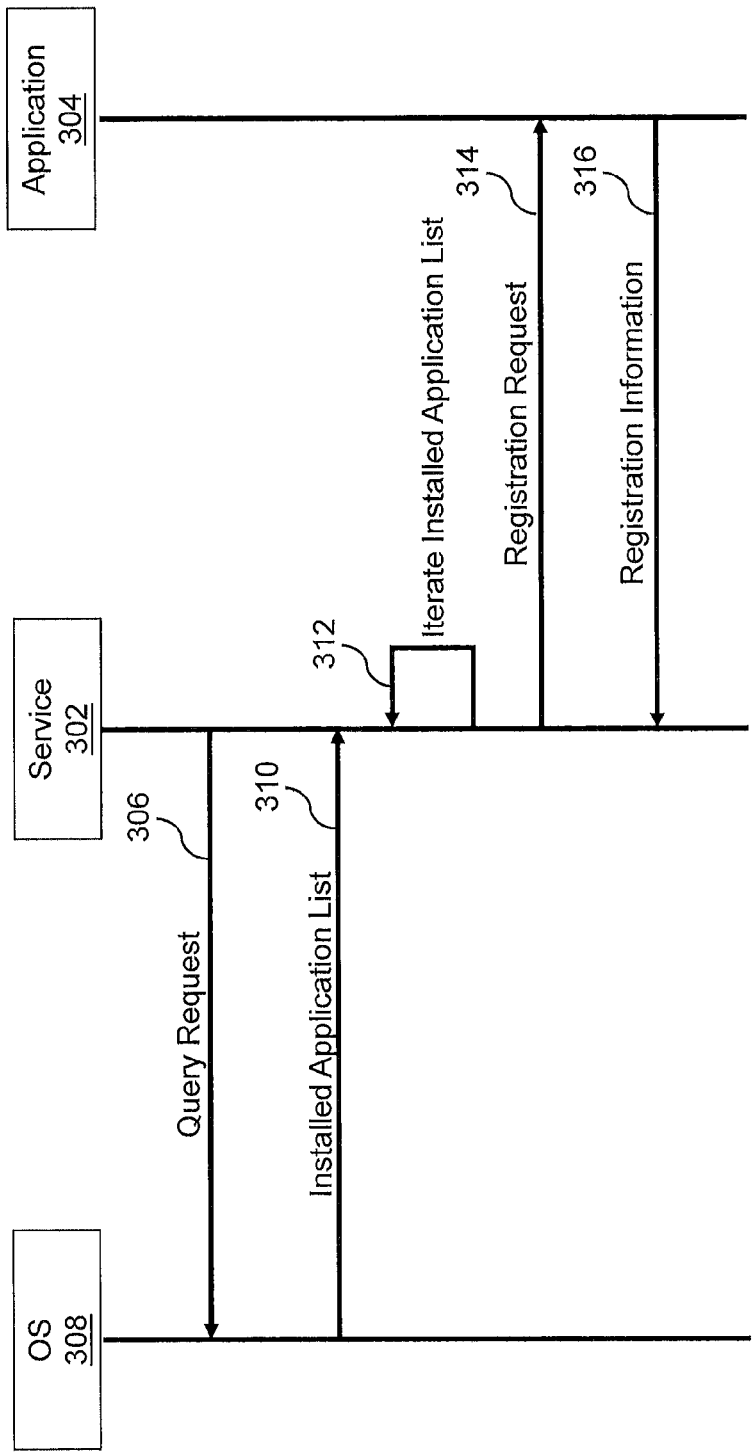
FIG. 3 depicts a flow diagram illustrating application registration with a non-OS service based on a query request, in accordance with various aspects of the present disclosure.

As an example, FIG. 3 depicts a flow diagram illustrating application registration with a non-OS service based on a query request, in accordance with various aspects of the present disclosure. In one use case, service 302 may not be running during a broadcast of an installation indication specifying that application 304 is being installed. Thus, as noted above, service 302 may not know that application 304 has been installed. In this case, service 302 may send query request 306 to operating system 308 during startup of service 302. In response, operating system 308 may provide service 302 with a list 310 of installed applications. Service 302 may then perform one or more iterations 312 of installed-applications list 310 to determine applications that have been installed. When a new application is detected during processing of installed-applications list 310, service 302 may send registration request 314 to that new application. For example, based on the installed-applications list 310, service 302 may determine that application 304 is an application that was installed on operating system 308 while service 302 was not running. As such, service 302 may send registration request 314 to application 304 to notify application 304 to register with service 302. In response to receipt of registration request 314, application 304 may run code linked from an SDK or other development tools associated with service 302 to register with service 302. During such registration, application 304 may provide registration information 316 associated with application 304 to service 302. Service 302 may then store and maintain registration information 316.

In some embodiments, with respect to FIG. 1, the service at communication device 102 may be configured to initiate removal of registration information associated with another application based on determining that the information specifying installed applications does not indicate the other application as one of the installed applications. By way of example, turning to FIG. 3, installed-applications list 310 may not include a particular application as one of the installed applications on operating system 308. For example, the particular application may be an application that was previously registered with service 302, but later uninstalled from operating system 308. Upon determining that the particular application is not indicated in installed-applications list 310 as an installed application, service 302 may remove registration information associated with the particular application.

In some embodiments, the service may facilitate interactions between components of the communication device 102 on which the service is configured to run (e.g., at which the service is installed) and components of another communication device 102. By way of example, the service may detect a session request from the other communication device 102 for initiating a session between the application installed on the communication device 102 and another application installed on the other communication device 102. The session request may, for instance, be received at the communication device 102 while the application at the communication device 102 is not running. As such, in response to detecting the session request, the service may initiate startup of the application at the communication device 102 to process the session request. For example, the service may utilize registration information that the service maintains to determine that the session request relates to the application. The service may then send a wake-up call to the application, along with the session request, to cause startup of the application so that the application may process the session request.

In one use case, a first user of a game may utilize a first game application on a first communication device 102 may send an invitation to a second user of the game that invites the second user to join the first user in a game session. The invitation may be routed to a second game application on a second communication device 102 associated with the second user. Even if the second game application is not running, the service that maintains registration information for the second game application may detect and process the invitation to determine that the invitation relates to the second game application. As such, the service may send a wake-up call to the second game application so that the second game application may process the invitation for the second user.

Figure 4:
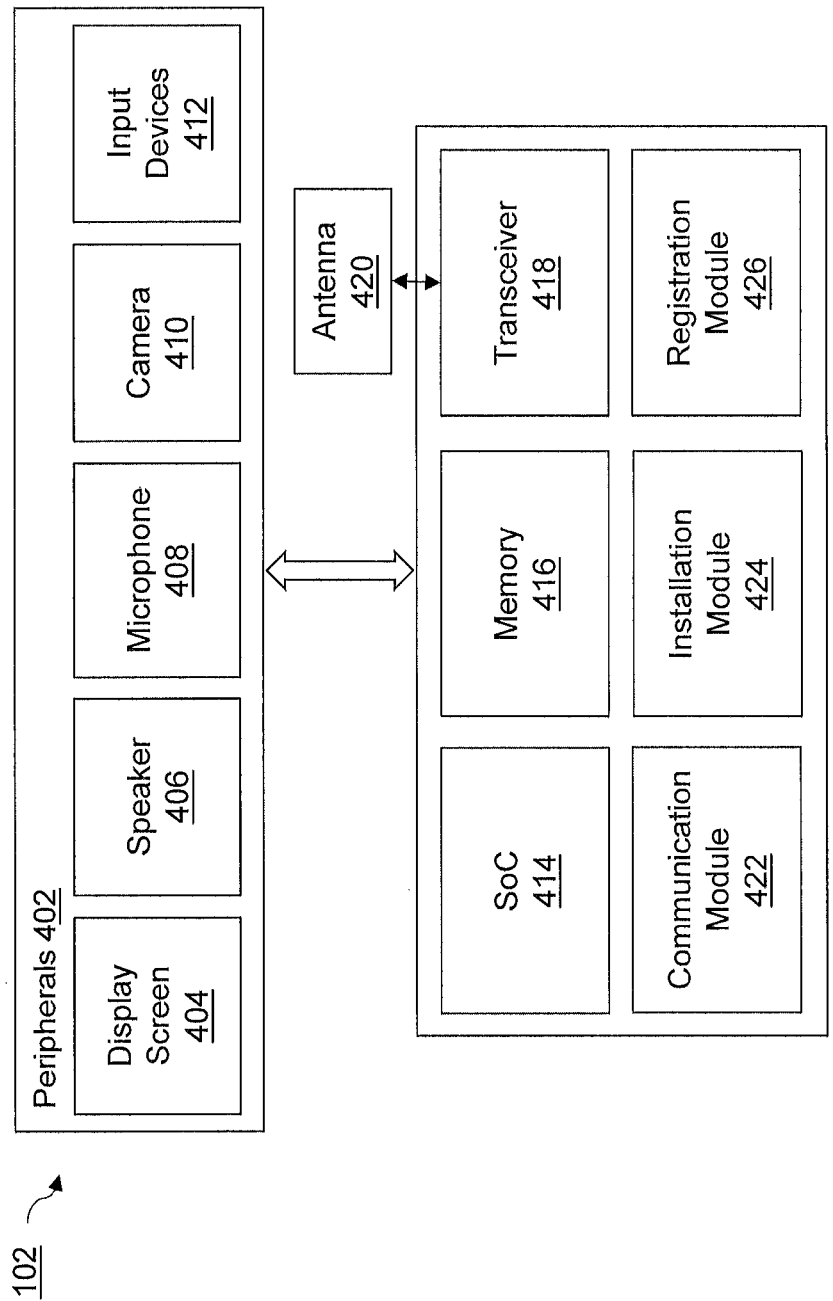
FIG. 4 illustrates a high-level functional block diagram of a communication device, in accordance with various aspects of the present disclosure.

FIG. 4 illustrates a high-level functional block diagram of communication device 102, in accordance with various aspects of the present disclosure. As an example, communication device 102 may include a variety of peripheral components 402, such as, for example, display screen 404, speaker 406, microphone 408, camera 410, input devices 412, as well as a system-on-a-chip (SoC) 414, memory 416, a transceiver 418, an antenna 420 (e.g., RF antenna), a communication module 422, an installation module 424, a registration module 426, and/or other components. Communication device 102 may, for instance, also include a bus infrastructure and/or other interconnection means to connect and communicate information between various components of communication device 102.

In some embodiments, SoC 414 may be part of a core processing or computing unit of communication device 102, and may be configured to receive and process input data and instructions, and to provide output and/or control other components of communication device 102, in accordance with embodiments of the present disclosure. SoC 414 may include a microprocessor, a memory controller, a memory, and/or other components. The microprocessor may further include a cache memory (e.g., SRAM), which along with the memory of SoC 414 may be part of a memory hierarchy to store instructions and data. The microprocessor may also include one or more logic modules such as a field programmable gate array (FPGA) or other logic array. Communication between the SoC 414's microprocessor and memory may be facilitated by the memory controller (or chipset), which may also facilitate communication with peripheral components 402.

Memory 416 may be a dynamic storage device coupled to the bus infrastructure and configured to store information, instructions, and programs (e.g., such as applications integrated with software modules of communication device 102) to be executed by processors of SoC 414 and/or other processors (or controllers) associated with communication device 102. Some of all of memory 416 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Communication device 102 may also include read only memory (ROM) and/or other static storage devices coupled to the bus infrastructure and configured to store static information and instructions for processors of SoC 414 and/or other processors (or controllers) associated with communication device 102.

Transceiver 418 may be configured to transmit and receive signals. For example, in one use case, transceiver 418 may be a wireless transceiver that includes a transmitter and a receiver for transmitting and receiving wireless signals (e.g., via antenna 420). The transmitter and the receiver may, for instance, be combined and share common circuitry or a single housing. Communication module 422 may be configured to utilize the transceiver to transmit and receive messages. Communication module 422 may perform initial processing of the messages to determine where the messages are to be forwarded and/or how those messages should be further processed. Communication module 422 may also be configured to facilitate communication between components of communication device 102 as well as an operating system, applications, and/or services associated with the components.

Installation module 424 may be configured to facilitate installation of applications and/or services. For example, an operating system of communication device 102 may utilize installation module 424 to install an application, generate an installation indication specifying that the application is being installed, and/or perform other functions relating to installation.

Registration module 426 may be configured to facilitate registration of applications with a service (e.g., a non-OS service). For example, in response to determining that an installation of an application has been initiated, the service may utilize registration module 426 to generate the registration request that includes a notification for the application to register with the service. Registration module 426 may then work with communication module 422 to send the registration request to the application so that the application may register with the service. In addition, the service may utilize registration module 426 to maintain registration information associated with a plurality of applications installed at communication device 102.

Figure 5:
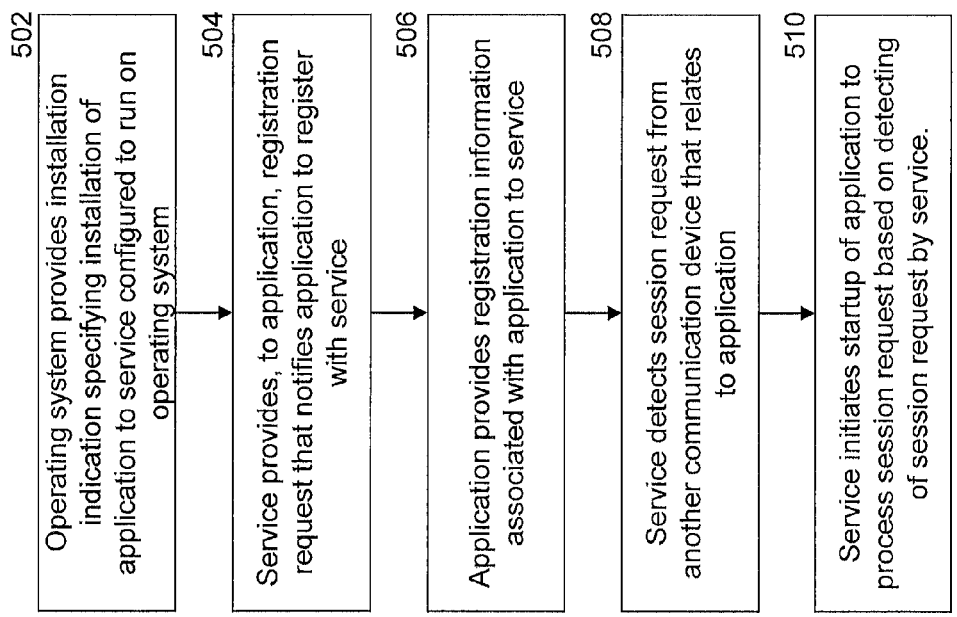
FIG. 5 depicts a high-level flow diagram of a process for facilitating application registration with a non-OS service, in accordance with various aspects of the present disclosure.

FIG. 5 depicts a high-level flow diagram of a process for facilitating application registration with a non-OS service, in accordance with various aspects of the present disclosure. It should be noted that the process of FIG. 5 is intended to be illustrative. In some embodiments, the process of FIG. 5 may be occur with one or more additional blocks not described, and/or without one or more of the blocks discussed. Additionally, the order with respect to the process that is illustrated in FIG. 5 and described below is not intended to be limiting. With such understanding in mind, in block 502, an operating system may provide an installation indication specifying an installation of an application to a service configured to run on the operating system. For example, the installation indication may specify that the installation of the application has been initiated on the operating system of a communication device 102.

As noted above, in some embodiments, the installation indication may be provided to the service via a broadcast of the installation indication. In one scenario, for instance, the operating system may broadcast the installation indication in response to the installation of the application on the operating system. In certain embodiments, the installation indication may be provided to the service based on a query request by the service. For example, during startup of the service, the service may initiate a query request for information specifying applications that have been installed on the operating system. In response to the query request, the operating system may provide the service with installed-applications information that includes the installation indication with respect to the application.

In block 504, the service may provide, to the application, a registration request that notifies the application to register with the service. For example, when the installation indication is received by the service, the service may process the installation indication to determine the application that is being installed or has been installed on the operating system. In response to such determination, the service may generate a registration request for the application to notify the application to register with the service.

In block 506, the application may provide registration information associated with the application to the service. As noted above, the registration information may include an application identifier, a file location associated with the application, code for interacting with the application, and/or other information relating to registration of the application.

In block 508, the service may detect a session request from another communication device that relates to the application. As an example, the detected session request may be a request for initiating a session between the application installed at the communication device 102 and another application installed on another communication device 102. In one scenario, the application at the communication device 102 may be not running when the session request is received by the communication device 102. As such, the service may actively listen for such session requests and/or other requests for the application while the application is not running.

In block 510, the service may initiate startup of the application to process the session request based on the detecting of the session request by the service. For example, the service may utilize the registration information that it maintains to determine the session request relates to the application. Based on such determination, the service may send a wake-up call to the application, along with the session request, to cause startup of the application so that the application may process the session request.

By virtue of the disclosed configurations and processes, with respect to application registration, a number of benefits are achieved. Some of these benefits may, for instance, include faster startup of applications (e.g., due to reduction in a need to register with other components at each startup), a reduced need for an operating system to provide such registration procedures, decreased need for applications to actively listen for requests related to the respective applications, and/or other benefits.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A communication device comprising:
   a memory unit;
   logic configured to:
      provide an installation indication that an installation of an application has been initiated on an operating system of the communication device to a service configured to run on the operating system;
      provide, to the application, a registration request that is initiated by the service based on receipt of the installation indication by the service and that notifies the application to register with the service; and
      provide registration information associated with the application to the service based on receipt of the registration request by the application.

2. The communication device of claim 1, wherein the service is a non-OS service configured to maintain registration information for a plurality of applications installed on the operating system.

3. The communication device of claim 1, wherein the installation indication is provided to the service by broadcasting the installation indication such that services and/or applications at the communication device that are running receives the installation indication via the broadcasting while services and/or applications at the communication device that are not running do not receive the installation indication via the broadcasting.

4. The communication device of claim 1, wherein the installation indication is provided to the service based on a query request by the service for information specifying applications that have been installed on the operating system.

5. The communication device of claim 4, wherein the logic is configured to broadcast the installation indication in response to the installation of the application on the operating system, and wherein the service does not receive the installation indication via the broadcasting.

6. The communication device of claim 4, wherein the query request is initiated by the service during startup of the service.

7. The communication device of claim 4, wherein the registration request is initiated by the service based on the information specifying installed applications.

8. The communication device of claim 4, wherein the service is configured to initiate removal of registration information associated with another application based on determining that the information specifying installed applications does not indicate the other application as one of the installed applications.

9. The communication device of claim 1, wherein the logic is configured to:
   detect, via the service while the application is not running, a session request from another communication device for initiating a session between the application installed on the communication device and another application installed on the other communication device; and
   initiate startup of the application to process the session request based on the detecting of the session request by the service.

10. A system comprising:
    a communication device that includes:
       a memory unit; and
       logic configured to:
          provide an installation indication that an installation of an application has been initiated on an operating system of the communication device to a service configured to run on the operating system;
          provide, to the application, a registration request that is initiated by the service based on receipt of the installation indication by the service and that notifies the application to register with the service; and
          provide registration information associated with the application to the service based on receipt of the registration request by the application.

11. The system of claim 10, wherein the service is a non-OS service configured to maintain registration information for a plurality of applications installed on the operating system.

12. The system of claim 10, wherein the installation indication is provided to the service by broadcasting the installation indication such that services and/or applications at the communication device that are running receives the installation indication via the broadcasting while services and/or applications at the communication device that are not running do not receive the installation indication via the broadcasting.

13. The system of claim 10, wherein the installation indication is provided to the service based on a query request by the service for information specifying applications that have been installed on the operating system.

14. A method comprising:
    providing an installation indication that an installation of an application has been initiated on an operating system of a communication device to a service configured to run on the operating system;
    providing, to the application, a registration request that is initiated by the service based on receipt of the installation indication by the service and that notifies the application to register with the service; and
    providing registration information associated with the application to the service based on receipt of the registration request by the application.

15. The method of claim 14, wherein the service is a non-OS service configured to maintain registration information for a plurality of applications installed on the operating system.

16. The method of claim 14, wherein the installation indication is provided to the service by broadcasting the installation indication such that services and/or applications at the communication device that are running receives the installation indication via the broadcasting while services and/or applications at the communication device that are not running do not receive the installation indication via the broadcasting.

17. The method of claim 14, wherein the installation indication is provided to the service based on a query request by the service for information specifying applications that have been installed on the operating system.

18. The method of claim 17, further comprising broadcasting the installation indication in response to the installation of the application on the operating system, and wherein the service does not receive the installation indication via the broadcasting.

19. The method of claim 17, wherein the registration request is initiated by the service based on the information specifying installed applications.

20. The method of claim 14, further comprising:
- detecting, via the service while the application is not running, a session request from another communication device for initiating a session between the application installed on the communication device and an application installed on the other communication device; and
- initiating startup of the application to process the session request based on the detecting of the session request by the service.

* * * * *